United States Patent [19]
Cheng

[11] Patent Number: 5,409,253
[45] Date of Patent: Apr. 25, 1995

[54] COLLAPSIBLE GOLF CART

[76] Inventor: Ying-Hsiung Cheng, No. 14, Lane 477, Chung Shan Road, Jen Te Hsiang, Tainan Hsien, Taiwan, Prov. of China

[21] Appl. No.: 265,130
[22] Filed: Jun. 24, 1994
[51] Int. Cl.6 .............................................. B62B 1/12
[52] U.S. Cl. ............................... 280/646; 280/DIG. 6
[58] Field of Search ................... 280/646, DIG. 6, 42, 280/652, 654, 655, 655.1, 47.19, 47.26

[56] References Cited
U.S. PATENT DOCUMENTS

| 4,913,460 | 4/1990 | Klein | 280/DIG. 6 X |
| 4,946,186 | 8/1990 | Cheng | 280/DIG. 6 X |
| 5,074,577 | 12/1991 | Kim | 280/DIG. 6 X |
| 5,106,117 | 4/1992 | Wang | 280/DIG. 6 X |
| 5,143,399 | 9/1992 | Lin | 280/DIG. 6 X |
| 5,180,087 | 1/1993 | Lee | 280/646 X |
| 5,180,184 | 1/1993 | Chiu | 280/DIG. 6 X |
| 5,184,911 | 2/1993 | Wu | 280/DIG. 6 X |
| 5,201,540 | 4/1993 | Wu | 280/DIG. 6 X |
| 5,281,044 | 1/1994 | Chen | 280/DIG. 6 X |
| 5,288,099 | 2/1994 | Wu | 280/DIG. 6 X |

Primary Examiner—Brian L. Johnson
Attorney, Agent, or Firm—Morton J. Rosenberg; David I. Klein

[57] ABSTRACT

A collapsible golf cart is provided which includes a support rod, a hollow operating rod, a score board and two wheels movably combined with connecting rods to the operating rod. The hollow operating rod has a bottom case formed in a lower section which is either secured to or released from an upper end section of the support rod for operatively opening or collapsing the golf cart by operation of a push button unit which pulls on a rope extending through an inner passage of the hollow operating rod for disengaging a pair of rod projections from a pair of holes formed through a positioning member of the support rod.

2 Claims, 8 Drawing Sheets

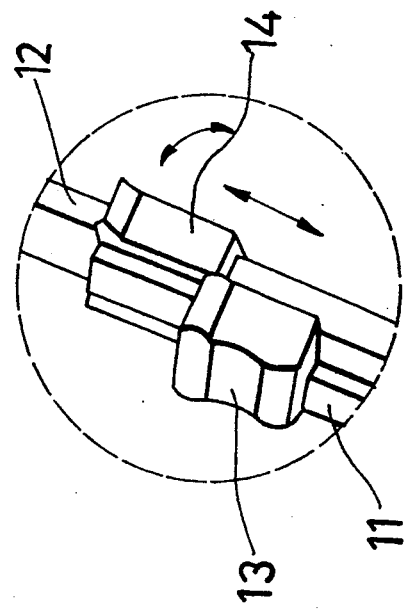
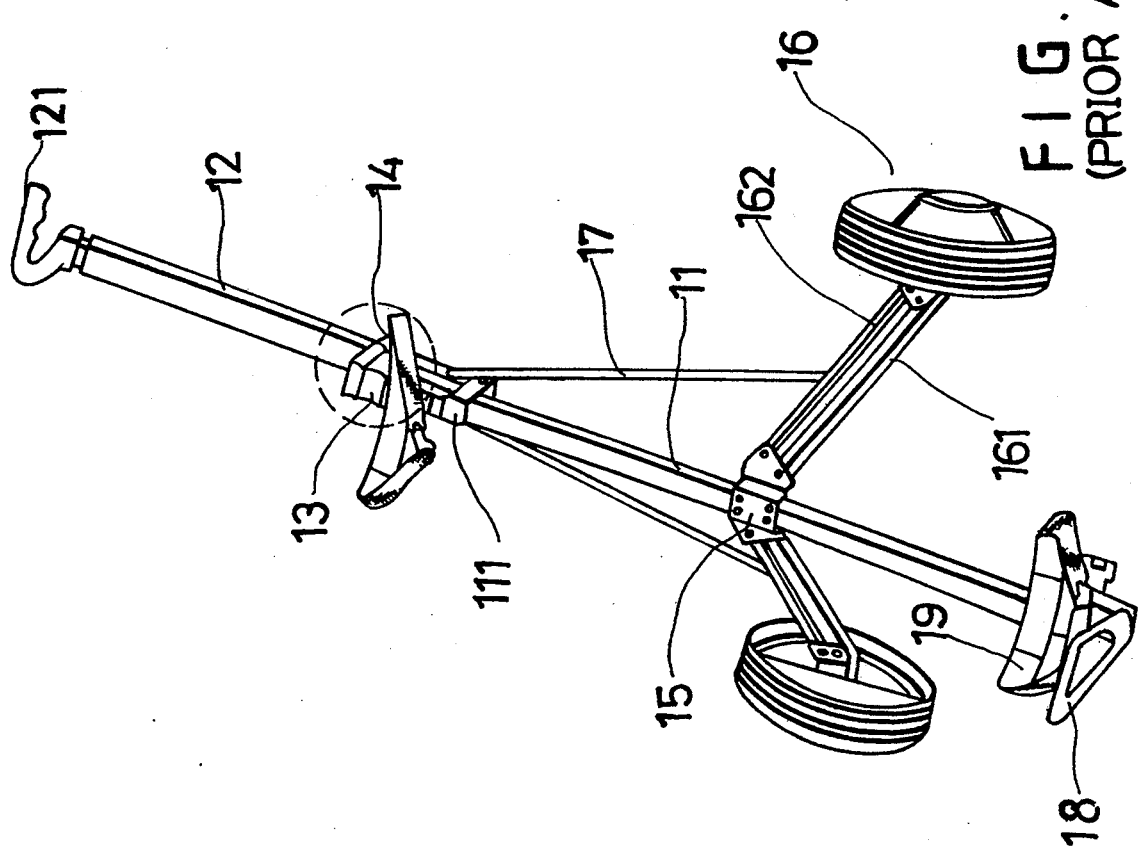
FIG. 14 (PRIOR ART)
FIG. 13 (PRIOR ART)

COLLAPSIBLE GOLF CART

BACKGROUND OF THE INVENTION

1. Field of the Invention

This invention is directed to golf carts. In particular, this invention pertains to collapsible golf carts.

2. Prior Art

A prior art collapsible golf cart is shown in FIG. 13 which includes a support rod 11, an operating rod 12 and two wheels 16 in combined relation.

In the prior art golf cart as shown, an inverted U-shaped connector 11 is secured to an upper portion of the support rod 11, pivotally connected to the operating rod 12. A stop block 13 is provided at a top section of the support rod 11, and a slide block 14 is provided on a lower section of the operating rod 12 which is engageable with the stop block 13. A connector 15 is mounted on an intermediate section of the support rod 11 and connects two pairs of wheel rods 161, 162 of respective wheels 16. The wheel rods 161 respectively have a pivot hole formed in an intermediate portion for a lower end of a connecting rod 17 to fit therein. A bottom plate 18 is provided at the bottom of the support rod 11 for a bottom of a golf club bag to rest thereon, and two bands 19 are respectively provided for securing the golf club bag to the prior art golf cart. A grip 121 is provided at the top of the operating rod 12 for pushing this golf cart along a ground surface.

In order to collapse the prior art golf cart, one hand is used to hold the grip 121 on top of the operating rod 12 while the user's other hand, as shown in FIG. 14, has to push the slide block 14 to disengage the slide block 14 from the stop block 13. The operating rod 12 is then folded down with the inverted U-shaped connector 111 being a pivot point. Meanwhile, the pivotal connecting point of the connecting rods 17 and the operating rod 12 moves down accordingly, forcing the wheel rods 161, 162 together with the wheels 16 being displaced nearer to the support rod 11 to provide a collapsed assembly.

However, the prior art collapsible golf cart is inconvenient to use in that the stop block 13 and the slide block 14 easily engage firmly to each other, making it harder to push the slide block away from the stop block. Additionally, a user must use both hands to collapse the cart. Still further, the connecting rods 17 and the wheel rods 161 are aligned with each other in the collapsed position, forming a dead point which causes difficulties in spreading out the golf cart to an operating assembly.

SUMMARY OF THE INVENTION

An object of the present invention is to provide a hollow operating rod having a bottom case within which is located a spring having both ends attached by a rod projection bored with a hole for a bottom end of a rope to pass through. The rope has its upper end mounted to a push button assembly to pull the rope to displace the two rod projections inwardly thus compressing the spring, resulting in the two rod projections displacing inwardly to disengage from two holes of a position member of a support rod. The operating rod can then be pushed down along the support rod when the push button is pressed to collapse the cart.

In the subject golf cart system two wheels are pivotally connected by wheel rods which are pivotally connected to a connector secured to an intermediate portion of the support rod. A pair of laterally foldable connecting rods are pivotally connected between the two wheel rods and the support rod to keep the two wheels in a fixed and stable coupling when spread out for use. In addition, two connecting rods are provided between the two wheel rods and a slide block is provided on the upper end portion of the support rod for convenience in spreading or collapsing the cart.

BRIEF DESCRIPTION OF THE DRAWINGS

FIG. 13 is a perspective view of a prior art collapsible golf cart; and,

FIG. 14 is a perspective view of a stop block and a slide block of the prior art collapsible golf cart.

DESCRIPTION OF THE PREFERRED EMBODIMENTS

Figure 1:
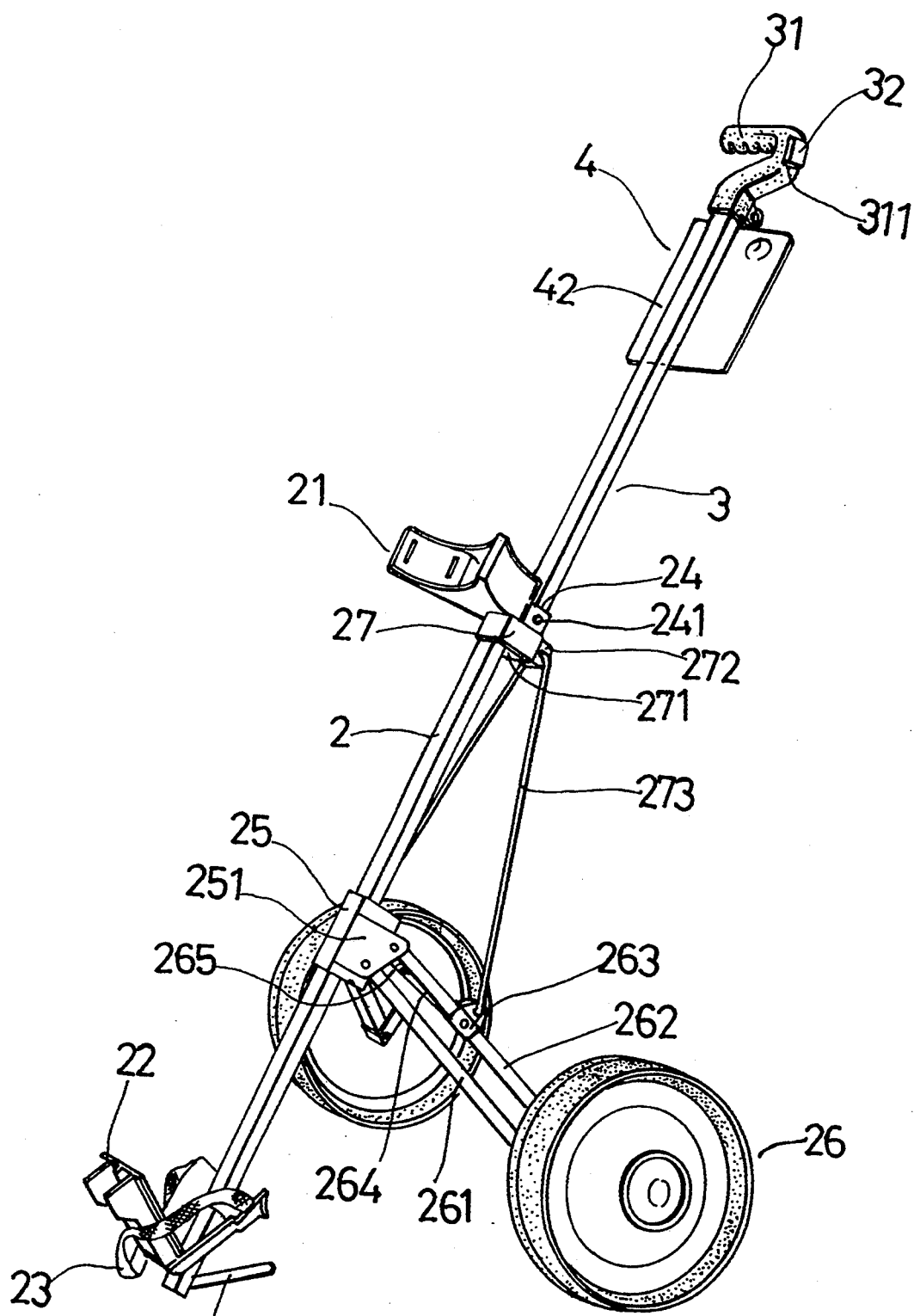
FIG. 1 is a perspective view of a collapsible golf cart in the present invention.

Referring now to FIG. 1, there is shown a collapsible golf cart of the present invention which includes a support rod 2, a hollow operating rod 3 and a score board 4 provided in combined structural relation as main structural components of the subject collapsible golf cart.

The support rod 2 shown in FIG. 1 has a triangularly shaped leaning block 21 forming an arcuate surface as shown. A bottom plate 22 in combination with band 23 is provided to secure a golf club bag to the golf cart. A step rod 20 is formed in a lower or bottom section of support rod 2. A position member 24 is connected to the bottom of the leaning block 21 and a connecting member 25 surrounds an intermediate portion of the support rod 2. Two plates 251, 251 extend slopingly on opposing sides of the connecting member 25. Two pairs of wheel rods 261, 262 are connected between the plates 251, 251 and a respective one of the wheels 26, 26. A pair of connectors 263 are provided with each attached to an intermediate portion of each wheel rod 261 and pivotally connected to one end of a lateral foldable rod 264.

The other end of the rod 264 is pivotally connected to a pivotal connector 265 attached to the support rod 2. A slide block 27 is mounted to and slidably displaceable to support rod 2. The slide block 27 has an inner empty space or chamber 271 and a projecting tooth disc 272. A pair of connecting rods 273, 273 are provided with each being pivotally connected between the disc 272 and a respective one of the two connectors 263, 263.

Figure 3:
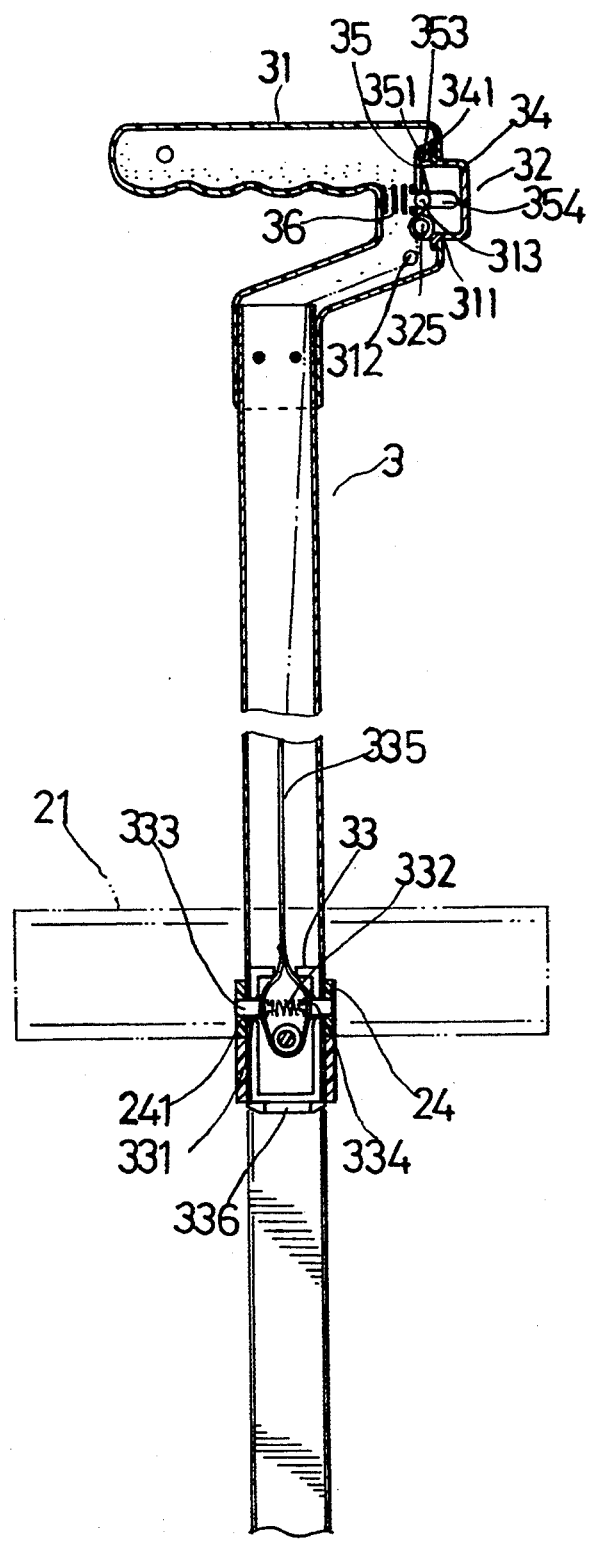
FIG. 3 is a lateral cross-sectional view of an operating rod in the collapsible golf cart in the present invention.
Figure 4:
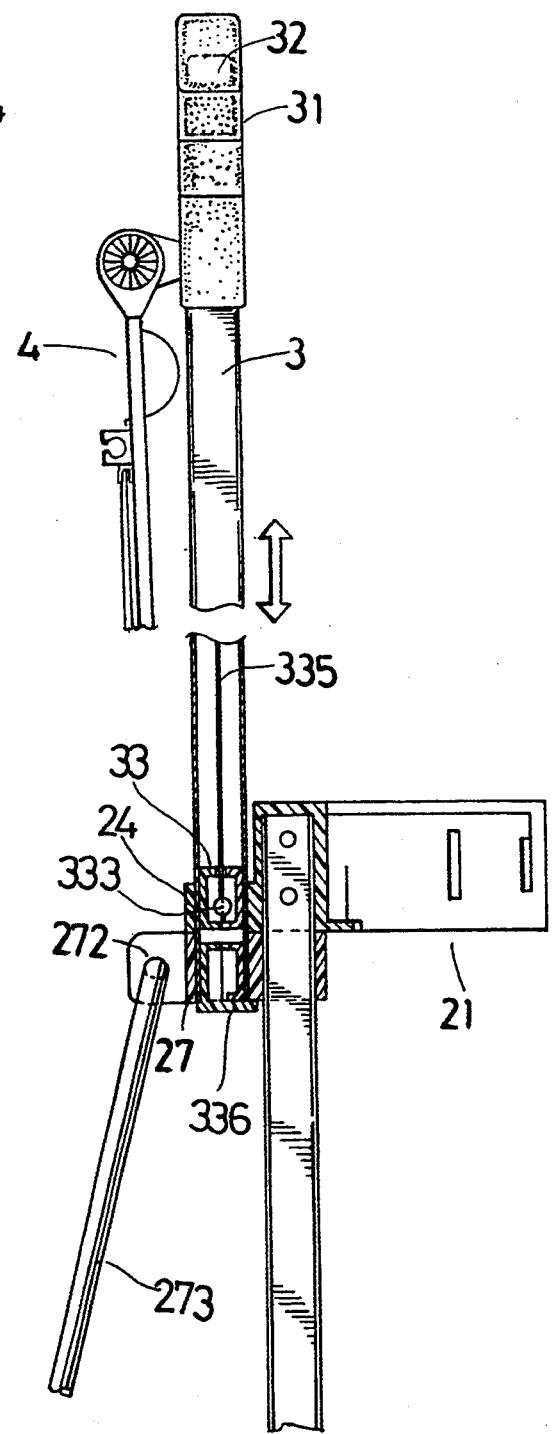
FIG. 4 is a longitudinal cross-sectional view of the operating rod in the collapsible golf cart in the present invention.

The hollow operating rod 3 having an internal through passage is shown in FIGS. 3 and 4 and includes a bent grip 31 having a bored square hole 311 formed through an end surface. A push button unit 32 is fitted or inserted in the hole 311. A bottom case 33 in a lower or bottom section of the rod 3 has two opposite side round holes 331, 331. A spring 332 has both opposing ends attached to a rod projection 333 which is bored with a hole 334. A rope 335 has a bottom or lower end passing through the two holes 334 of the two rod projections 333 as shown in FIG. 3. An upper end of the rope 335 is bound or fixedly secured to a second post 353 of the push button unit 32 and controls the tension in the rope 335. A projecting edge 336 extends from the lower case 33 at a bottom section for a slide block 27 to rest upon. The push button unit 32 consists of an upper U-shaped plate 34 and a lower plate 35. The upper plate 34 has a bottom flange 341 which engages the walls defining the contour of square hole 311. The lower plate 35 has two opposite sides 351, 351 curved at the ends to fit or matingly engage a first post 352 and a second post 353. An upper end of the rope 335 passes around a grip first post 312 in the grip 31 and passes around the first post 352, the grip second post 313 and then is bound or fixed to the second post 353. The upper plate 34 has a recess 354 formed therein for relative movement of the stationary post 313 as the push button unit 32 is displaced. A spring 36 is deposited or located between the lower plate 35 and an inner wall of the grip 31 to provide a biasing force.

Figure 5:
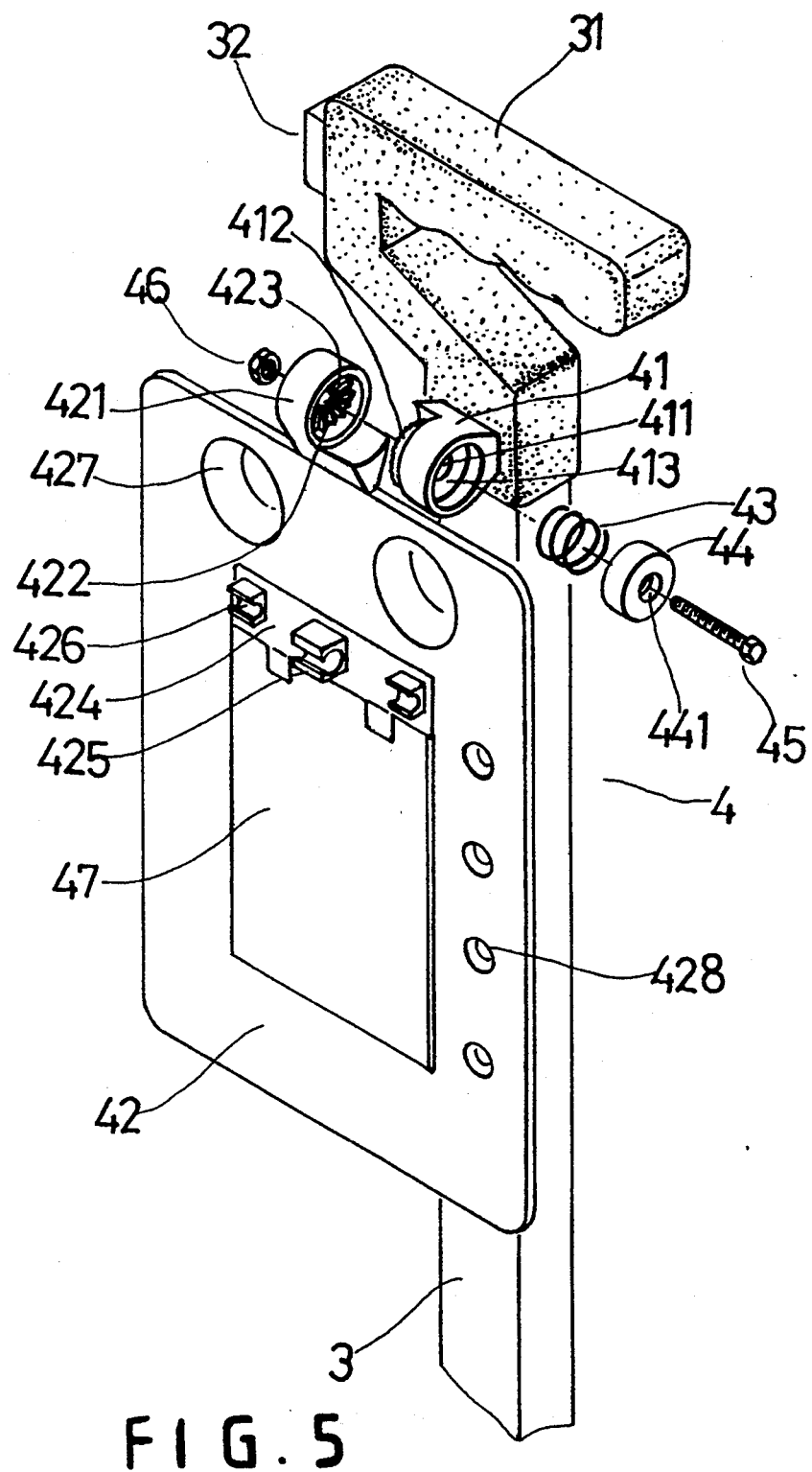
FIG. 5 is an exploded perspective view of a score board in the collapsible golf cart in the present invention.

The score board 4 as shown in FIG. 5 includes right projecting teeth or first disc 41 fixed to a bottom or lower section of the grip 31 and is provided with a through hole 411 as well as a plurality of projecting radial teeth 412 formed on a left side and a recessed cone-shaped surface 413 formed on a right side of disc 41. The score board 4 also has left projecting teeth or second disc 421 mounted on the top edge of scoreboard 4 which is provided with recessed radial teeth 422 formed at a right side thereof to engage or disengage from the teeth 412 of the right projecting teeth or first disc 41. A through hole 423 adapted for passage of bolt 45 is formed through discs 41 and 421. A cap 44 with a hole 441 is provided to fit in the recess 413 and a spring 43 is deposited or mounted in the recess 413 under the cap 44. Bolt 45 passes through the hole 441 of the cap 44, the through hole 411 of the first disc 41, the through hole 423 of the left teeth disc or second disc 412 for engagement with a nut 46. The two sets of teeth 412 and 422 of the right and the left teeth disc 41 and 421 matingly engage and disengage from each other to allow the score board 4 to be rotationally oriented to a predetermined angle with the bolt 45 being a pivot axis. A paper plate 424 with paper sheets 47 is provided on the score board body 42, and a chalk insert member 425 is provided on the plate 424 for insert therein. A chalk support 426 is provided on opposing sides of the chalk catcher 425. Two golf ball recesses 427 are formed in the upper portion of the score board 4 for holding golf balls. A plurality of tee recesses 428 are formed in a right side of body 42 for inserting golf tees therein.

Figure 10:
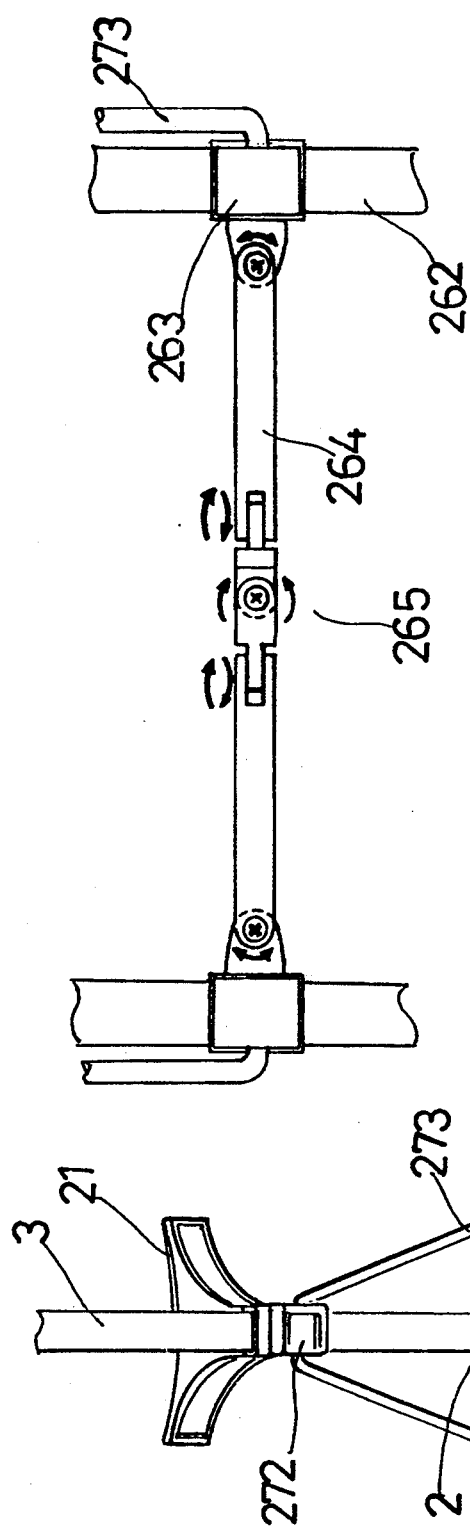
FIG. 10 is a side view of a pivotal connector in the collapsible golf cart in the present invention, showing the direction to fold the pivotal connector.
Figure 2:
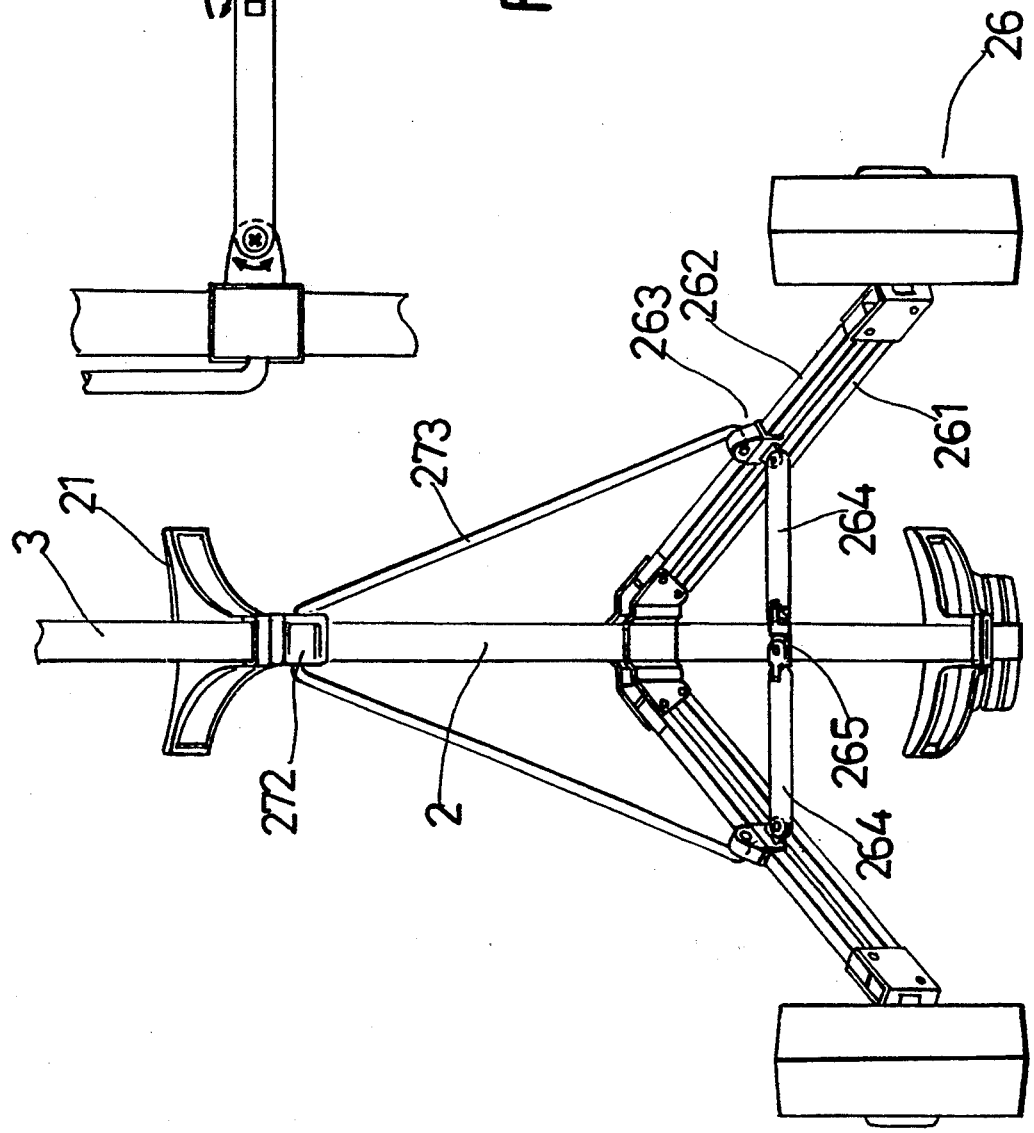
FIG. 2 is a partial rear view of the collapsible golf cart in the present invention.
Figure 7:
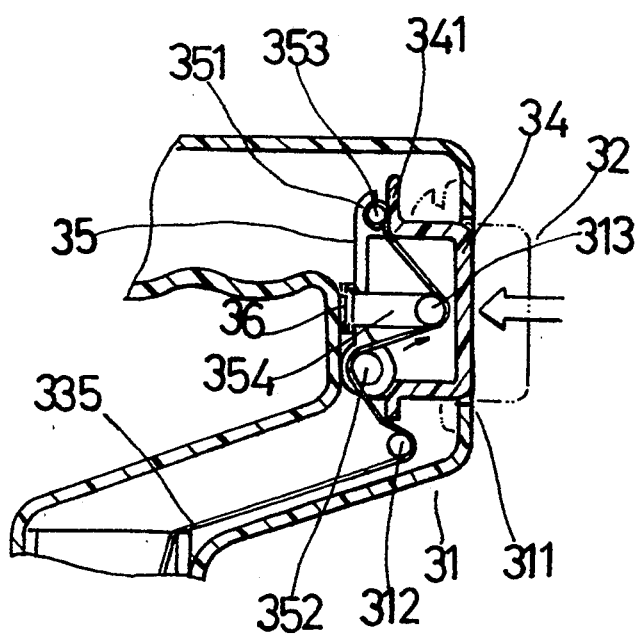
FIG. 7 is a cross-sectional view of a push button and a grip for collapsing in the collapsible golf cart in the present invention.
Figure 8:
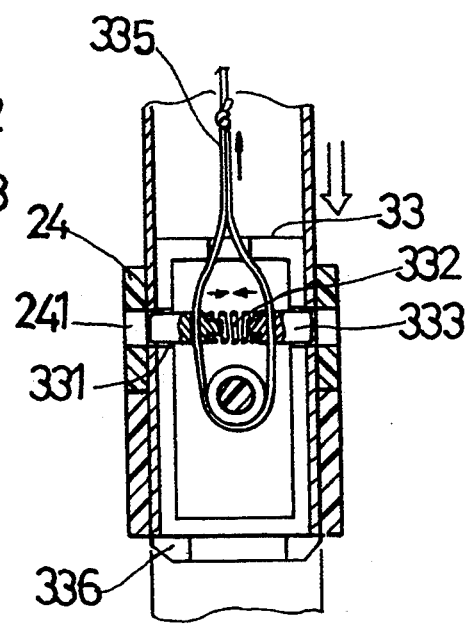
FIG. 8 is a cross-sectional view of a collapsing structure in a bottom case of the operating rod in the collapsible golf cart in the present invention.
Figure 9:
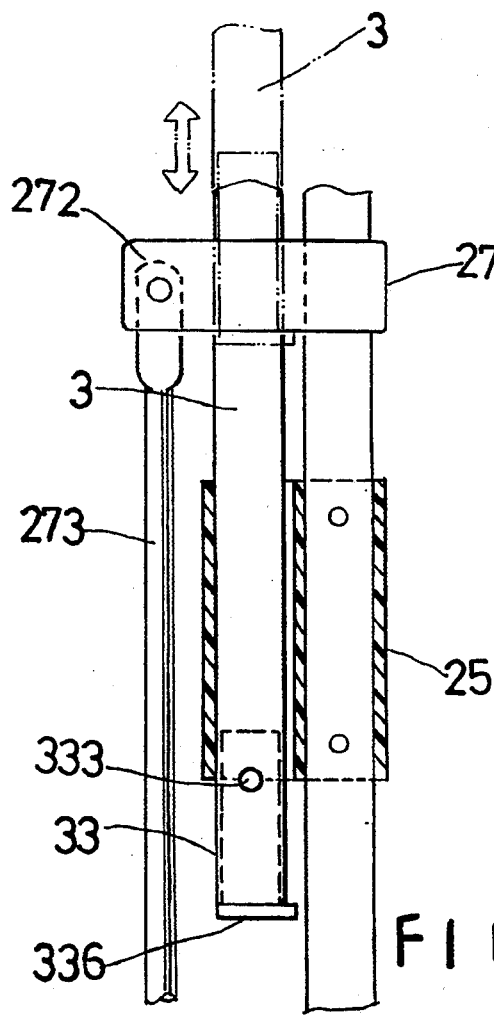
FIG. 9 is a side view of the operating rod being in collapsing position in the collapsible golf cart in the present invention.
Figure 6:
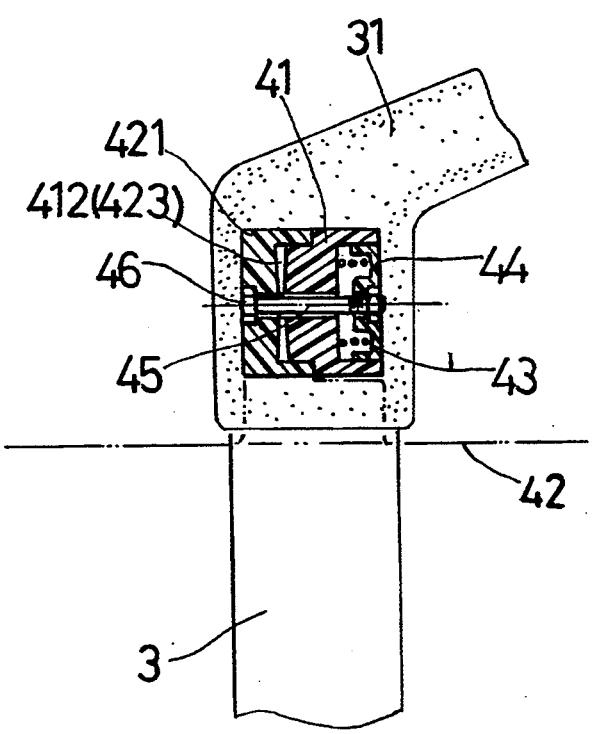
FIG. 6 is a cross-sectional view of a pivotal structure of the score board and the operating rod in the collapsible golf cart in the present invention.
Figure 11:
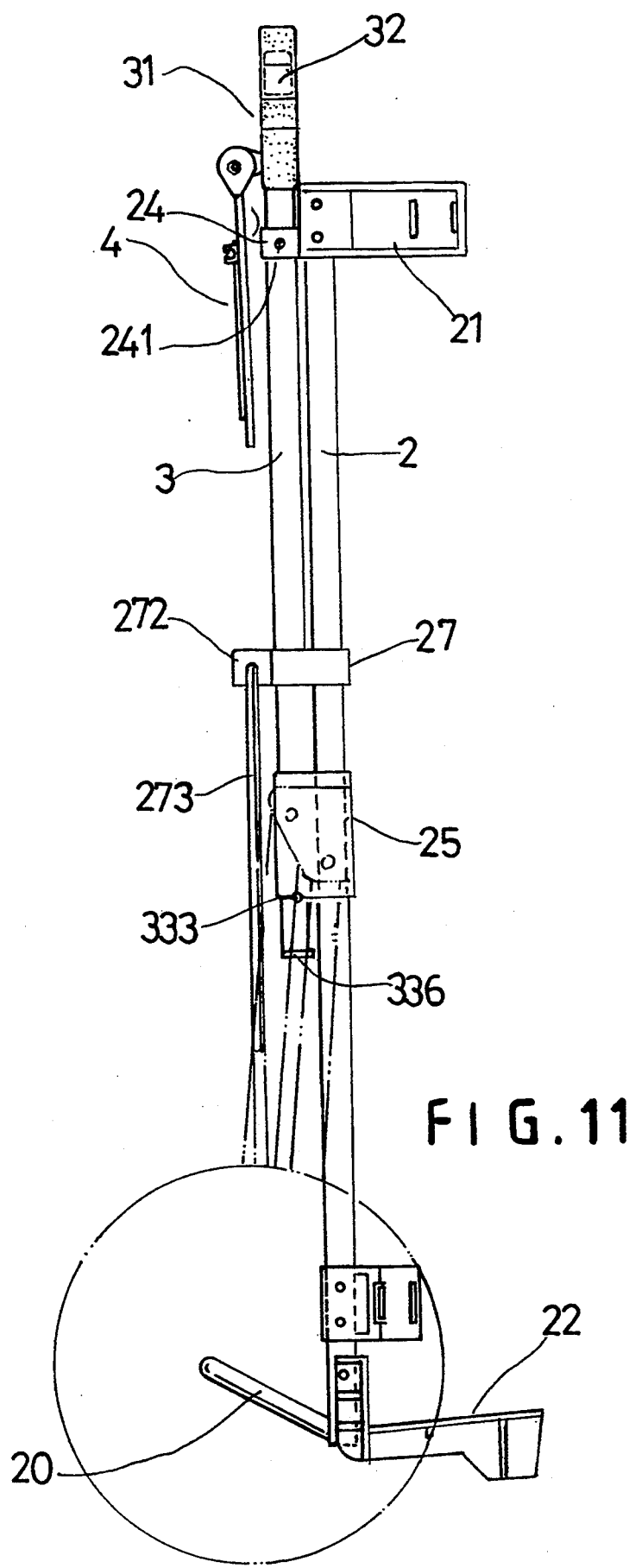
FIG. 11 is a side view of the collapsible golf cart being in collapsed position in the present invention.
Figure 12:
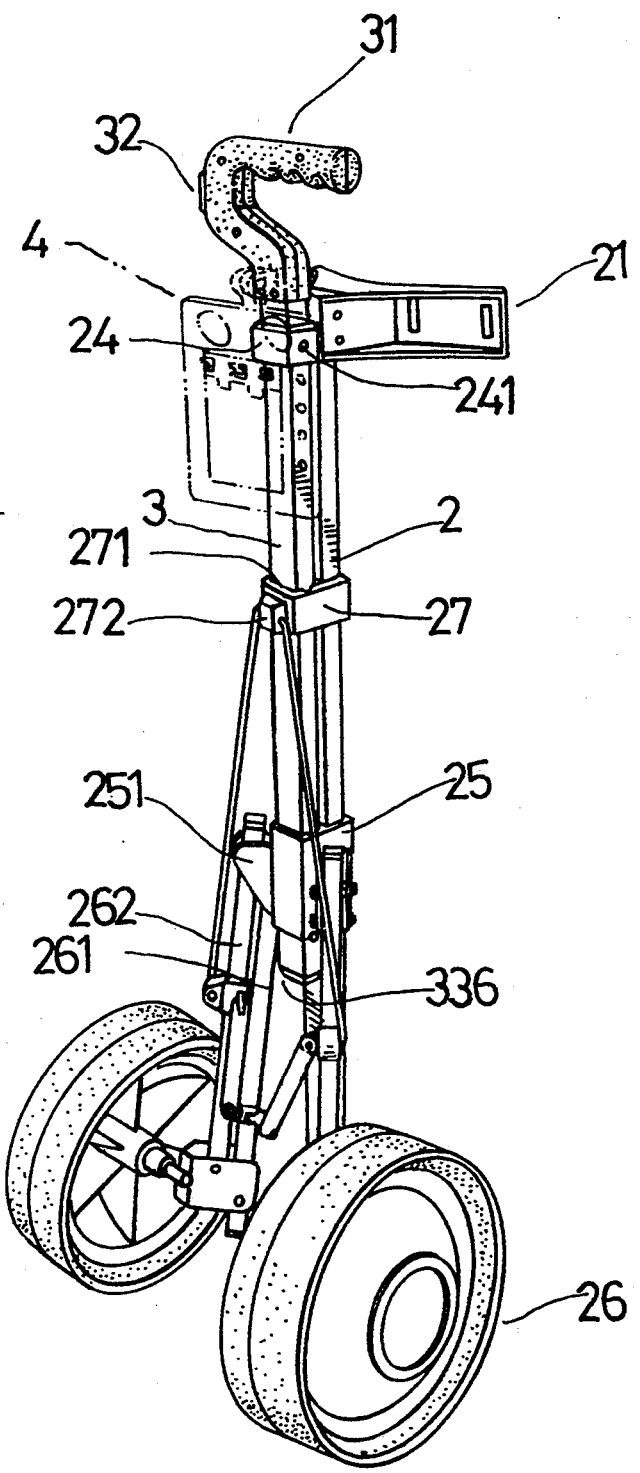
FIG. 12 is a perspective view of the collapsible golf cart being in collapsed position in the present invention.

After this golf cart is assembled as described above and as shown in FIGS. 3 and 4, the projecting edge 336 of the bottom case 33 of the operating rod 3 is located under the slide block 27 of the support rod 2. The two projections 333 of the bottom case 33 extend into the holes 334, 334 and into the holes 241, 241 of the position member 24 for fixed securement, in order to maintain the support rod 2 and the operating rod 3 in the spread position as shown in FIG. 1. When the golf cart is to be collapsed from the spread position shown in FIG. 1 to the collapsed position shown in FIG. 12, the user steps on the step rod 20 and with his or her hand presses on the upper plate 34 of the push button unit 32 as shown in FIGS. 7 and 8, which forces the lower plate 35 to compress the spring 36. The rope 335 is pulled up so that the lower end of the rope 335 pulls on the two rod projections 333, 333 to compress the spring 332 and move the projections 333, 333 from the holes 241, 241 out of the position member 24. The operating rod 3 is then pushed down as shown in FIG. 9, with the slide block 27 separated from the projecting edge 336 of the bottom case 33 of the operating rod 3 and slid downwardly. The two connecting rods 273, 273 pivotally connected to the slide block 27 move with the wheels 26, 26 and the wheel rods 261, 262 bend inwardly as shown in FIG. 10, with the lateral rods 264, 264 bending by means of the pivotal connector 265. Finally, the operating rod 3 is pushed downwardly with a lower end thereof passing through the connecting member 25, resulting in the grip 31 resting on the position member 24 as shown in FIGS. 11 and 12, which finishes the collapsing process.

In collapsing this cart, only one hand is needed for operation, resulting in the subject golf cart being more convenient to use than prior art golf carts. Provision of the connecting rods 273, 273 pivotally connected with the connectors 263 of the wheel rods 261, 262 permits the subject golf cart to spread out from the collapsed position with ease. The lateral rods 264, 264 reinforce support strength of the wheel rods 261, 262, when the subject golf cart is spread out for use.

While the preferred embodiments of the invention have been described above, it will be recognized and understood that various modifications may be made therein and the appended claims are intended to cover all such modifications which may fall within the spirit and scope of the invention.

What is claimed is:

1. A collapsible golf cart having a pair of laterally displaced wheels (26) comprising:
  (a) a support rod (2) having a substantially triangularly shaped leaning block (21) mounted thereto for serving as a golf club bag rest and a pedal rod (20) mounted at a bottom section thereof;
  (b) a bottom plate (22) coupled to a lower section of said support rod (2) for interface with a bottom surface of said golf bag, a band (23) adjacent said bottom plate (22) for encircling said golf bag;
  (c) a connecting member (25) coupled to said support rod (2) and having a pair of projecting plates (251) extending from opposing lateral sides thereof;
  (d) two pairs of connecting rods (261, 262) respectively pivotally connected between a respective projecting plate (251) and a respective wheel (26);

(e) a position member (24) located beneath said leaning block (21) having a pair of laterally directed holes (241);

(f) a pair of connectors (263) respectively coupled to a respective upper one of each of said pair of connecting rods (261, 262), each of said connectors (263) being pivotally coupled to a connecting rod (273) extending between a respective connector (263) and a projecting disc (272) coupled to said support rod (2);

(g) a slide block (27) slidably coupled to said support rod (2) having a hollow chamber for sliding insert therein of a hollow operating rod (3), said slide block (27) being pivotally coupled to said connectors (263) by said pair of pivotally mounted connecting rods (273), said hollow operating rod (3) having an internal through passage and a bent grip member (31) secured to a top portion thereof, said bent grip member having an opening (311) formed through wall thereof for displaceable insert thereof of a push button unit (32);

(h) a bottom case (33) secured to a bottom portion of said hollow operating rod (3) having laterally directed openings (331) for alignment with said leaning block holes (241), a bottom case laterally extending spring member (332) for bearing against a pair of projections (333) alignable with said holes (241) and said openings (331), each of said projections (333) having a through hole for passage therethrough of a rope (335), said rope (335) having a looped lower end section passing through said through holes formed through said projections (333) and around a bottom case post mounted within said bottom case (33), said rope (335) extending through said hollow operating rod (3) to an upper end thereof for contact with said push button unit (32), said push button unit (32) having an upper U-shaped plate (34) and a lower plate (35), said upper U-shaped plate (34) having a bottom flange (341) of greater dimension than said opening (311) for capturing said upper U-shaped plate (34) within said grip member (31), said lower plate (35) having opposing arcuate sides (351) mated to a first post (352) and a second post (353), said upper U-shaped plate (34) having a longitudinally extended groove (354) within which is mounted a grip second post (313), said push button unit being slidably movable with respect to said grip second post (313), said rope (335) having an upper section slidingly engaging and passing around a grip first post (312), said first post (352), said grip second post (313) and fixedly coupled to said second post (353), said lower plate (35) being in contiguous contact with a grip spring (36) providing a biasing force to said push button unit (32);

(i) a substantially rectangularly shaped scoreboard (4) secured to said grip (31), said scoreboard (4) having a first disc member (41) defining a plurality of first radially projecting teeth (412) and a first laterally directed central through opening (411) passing therethrough, said disc member (41) having a recessed conical section (413) for insert of a cap member (44), said scoreboard (4) further including a second disc member (421) having internally formed second radially projecting teeth (422) for mating engagement with said first radially projecting teeth (412) and a second laterally directed central through opening (423) coincident with said first through opening (411), said first disc member (41) further having a disc spring (43) mounted in said recessed conical section (413) for bearing against said cap member (44), said cap member (44), said first disc member (41) and said second disc member (421) being coupled each to the other by a bolt member (45) whereby said first radially projecting teeth (412) and said second radially projecting teeth (422) may be disengaged by displacing said cap member (44) to permit rotation of said scoreboard (4) to a predetermined orientation and then releasing said cap member (44) to permit mating re-engagement of said first and second teeth (412 and 422) to fixedly secure said scoreboard (4) in said predetermined orientation, said golf cart being collapsible whereby said push button unit (32) is displaced into said grip (31) wherein said stationary grip second post (313) is positioned at one end of said recess (354) and said lower plate (35) is displaced in contact with said grip spring (36) to pull said upper section of said rope (335) around said grip first post (312), said first post (352) and said grip second post (313) to pull said rope lower section into compressed relation with said spring (332) thereby removing said projections (333) from said position member (24) and permit relative sliding displacement between said hollow operating rod (3) and said support rod (2).

2. The collapsible golf cart as recited in claim 1 where said scoreboard (4) includes a paper plate mounted on said scoreboard (4) for holding a plurality of paper sheets and a chalk insert member (425) for releasably securing a writing implement to said scoreboard (4), said scoreboard (4) having a plurality of golf ball recesses (427) formed therein for mounting a respective golf ball within a respective golf ball recess (427) and a plurality of tee openings formed through said scoreboard (4) for releasable insert of respective tee members.

* * * * *